United States Patent [19]

Hasegawa

[11] Patent Number: 4,747,899

[45] Date of Patent: May 31, 1988

[54] METHOD FOR IMPROVING THE MECHANICAL STRENGTH OF VENEER SHEETS HAVING LATHE CHECKS

[75] Inventor: Katsuji Hasegawa, Ohbushi, Japan

[73] Assignee: Meinan Machinery Works, Inc., Aichi, Japan

[21] Appl. No.: 2,108

[22] Filed: Jan. 12, 1987

[30] Foreign Application Priority Data

| | | | |
|---|---|---|---|
| Jan. 31, 1986 | [JP] | Japan | 61-20320 |
| Feb. 6, 1986 | [JP] | Japan | 61-24655 |
| Feb. 10, 1986 | [JP] | Japan | 61-27544 |

[51] Int. Cl.[4] ..... B32B 31/20

[52] U.S. Cl. ..... 156/160; 156/163; 156/256; 156/295; 144/344; 144/346; 144/352

[58] Field of Search ..... 156/160, 163, 228, 250, 156/256, 278, 295, 297, 497; 144/209 R, 344, 345, 346, 348, 349, 350, 352

[56] References Cited

U.S. PATENT DOCUMENTS

| | | | |
|---|---|---|---|
| 1,657,280 | 1/1928 | Proctor | 144/352 |
| 1,741,471 | 12/1929 | Mavor et al. | 144/344 |
| 2,409,785 | 10/1946 | Newmark et al. | 144/348 |

*Primary Examiner*—Caleb Weston

*Attorney, Agent, or Firm*—Lahive & Cockfield

[57] ABSTRACT

A veneer sheet having lathe checks is pressed in at least one of two opposite directions in the same plane as the veneer sheet itself and substantially perpendicular to the directions of its fibers, while another sheet is being bonded to at least one of its two oposite sides, namely, its tight side having no lathe checks and its loose side having the lathe checks. Before the veneer sheet is pressed in this manner, glue may or may not be filled into the lathe checks thereof. Or glue is filled into the lathe checks of the veneer sheet, and is merely hardened, without bonding no other sheet thereto, while the sheet is being pressed in at least one of the foregoing two opposite directions.

18 Claims, 9 Drawing Sheets

METHOD FOR IMPROVING THE MECHANICAL STRENGTH OF VENEER SHEETS HAVING LATHE CHECKS

BACKGROUND OF THE INVENTION

This invention relates to methods for improving the mechanical strength of veneer sheets having lathe checks.

It is well known that veneer sheets produced by a veneer lathe, veneer slicer or the like have, on one or more surfaces thereof, a number of lathe checks, namely, tears or cracks brought about along the fibers of the sheets and at certain intervals depending upon the particular thickness of the sheet due to the bending of the sheets during the cutting operation thereof. Generally, the thinner the veneer sheet, the shallower its lathe checks, and the depth of lathe checks can be reduced as much as possible by selecting the most appropriate conditions for the cutting operation of the veneer sheets. However, it is very difficult to prevent the foregoing kinds of veneer sheets from having lathe checks. And, as shown in FIG. 6, such a veneer sheet 1 is usually curved to its tight side, that is, its side having no lathe checks.

Nevertheless, the inner openings or gaps of the veneer sheet 1 formed by its lathe checks 2 may be made smaller by bonding other boards, such as veneer sheets 30 with relatively small thicknesses and, hence, with no conspicuous lathe checks to both tight side (side having no lathe checks) and loose side (side having the lathe checks 2) of the veneer sheet 1 (after allowing the sheet 1 to dry or without doing so) (FIG. 10) so as to flatten the sheet 1. However, lathe checks are essentially tears, and the inner surfaces created thereby are very coarse. Therefore, the mere flattening of the sheet 1 may not completely or substantially close the openings and may not prevent at least some of the lathe checks from developing into noticeable gaps or openings in course of time.

Also, though on rare occasions, it may happen that very thick veneer sheets obtained from relatively slender logs and having lathe checks are curved to their loose sides (FIG. 7). Whether veneer sheets having lathe checks are curved to either side, such veneer sheets may be easily flattened, with a very small force, for use in manufacture of plywoods. That is, the mechanical strength of a veneer sheet having lathe checks is extremely low in its two opposite directions in the same plane as the sheet and substantially perpendicular to the directions of its fibers. Therefore such a sheet is usually not put to practical use, without improving its mechanical strength, except for such very special applications as manufacture of matchwood or small wooden boxes for packing food. Thus the practical value of such a veneer sheet as a single material is extremely small, and in most cases it is employed with another or other boards glued thereto.

However, as the usual lumber products of common materials show, wood itself is not necessarily so weak in the foregoing two opposite directions, but may have a sufficient mechanical strength suitable for practical use, depending upon their thicknesses. It is apparent that the very low mechanical strength of veneer sheets with lathe checks in its foregoing two opposite directions results from the presence of the lathe checks, and nothing but the lathe checks considerably reduces the practical value of the veneer sheets. Even if such a veneer sheet is bonded to other boards with relatively small thicknesses and, hence, with no conspicuous lathe checks, such a veneer sheet will certainly reduce the mechanical strength of such a product sooner or later. For example, in case of products where all or most of the veneer sheets bonded together are so arranged that their fibers extend in the same directions, their mechanical strength lowered by lathe checks might extremely restrict the range of use of such products. One example of such products is laminated veneer lumbers, which are expected to enjoy, as a substitute for the usual lumber products of common materials, a stronger and increasing demand in future.

For the purpose of improving the mechanical strength of veneer sheets having lathe checks, the inventor has carried out the following methods by using such veneer sheets having different moisture contents and divided into three groups at random:

(1) Filled glue into the lathe checks of each veneer sheet of the first group, flattened the sheet, and hardened the glue;

(2) Bonded other boards to both tight and loose sides of each veneer sheet of the second group with glue; and (3) Filled glue into the lathe checks of each veneer sheet of the the third group, and bonded other boards to both tight and loose sides of the sheet with glue, and hardened the glue filled into the lathe checks.

None of the above-mentioned methods, however, has proved not to substantially increase the mechanical strength of the veneer sheets.

To be more exact, for example, if a veneer sheet having lathe checks and curved as shown in FIG. 6 is filled with glue in its lathe checks and, after the sheet is flattened, the glue is hardened, the lathe checks cannot be completely or substantially closed because they are essentially tears and the inner surfaces of the sheet created thereby are very coarse, having innumberable wood particles between them. Rather, not a few of the lathe checks may develop into noticeable gaps, sooner or later, in spite of the presence of the glue in the lathe checks. Also, if such a veneer sheet as shown in FIG. 6 is processed by the above-mentioned method (2) or (3), its lathe checks cannot be completely or substantially closed for the same reason. Therefore none of the above-mentioned methods (1) to (3) can be relied on considerably to increase the mechanical strength of the veneer sheet. Also, since the flattening of such a veneer sheet as shown in FIG. 7 makes its lathe checks larger, it is more difficult to increase the mechanical strength of such a veneer sheet by the same methods as above.

There is a tendency that the size of the openings formed by lathe checks is substantially directly proportional to their depths. Also, lathe checks tend to develop into noticeable gaps as the veneer sheets are dried. At any rate, with regard to the above-mentioned methods (1) and (3), it is not possible completely to fill up lathe checks with the usual amount of glue as determined from the cost of processing the sheets and the like.

The inventor has carried out the foregoing methods (1) and (3) by using not only the usual amount of glue, but also a larger amount of it. However, since, needless to say, a lathe check is narrower toward its inner portion, and innumberable wood particles exist inside it, it is very difficult to fill a larger amount of glue uniformly into a lathe check; rather, there is a tendency that more glue is supplied in the outer portion thereof. Also, needless to say, the use of an increased amount of glue increases the cost of processing the veneer sheets. Furthermore, it is well known that the use of a larger amount of glue for bonding things together may reduce the bonding strength of the glue itself. For example, when using an increased amount of ureic adhesive for the methods (1) and (3), which adhesive is desirable in its properties as well as reasonable in its cost, the inventor has encountered the problem that the adhesive produces foam where more of it is supplied, and cannot bond the inner surfaces of the veneer sheets formed by the lathe checks together, with its inherent strength. Thus the use of the increased amount of adhesive could not increase the mechanical strength of the sheets proportionally.

Thus the inventor has recognized that none of the foregoing methods is a satisfactory one for improving the mechanical strength of veneer sheets having lathe checks, but found that it may be substantially increased by improving the foregoing methods as mentioned hereinafter.

SUMMARY OF THE INVENTION

It is an object of the invention to provide a method for improving the mechanical strength of a veneer sheet with lathe checks in its two opposite directions in the same plane as the sheet and substantially perpendicular to its fibers, which comprises bonding to such a veneer sheet another or other boards with glue while pressing the sheet in its foregoing two opposite directions or one of them.

It is another object of the invention to provide a method for improving the mechanical strength of a veneer sheet with lathe checks in its two opposite directions in the same plane as the sheet and substantially perpendicular to its fibers, which comprises filling glue into the lathe checks of such a veneer sheet and hardening the glue while pressing the sheet in its foregoing two opposite directions or one of them.

It is still another object of the invention to provide a method for improving the mechanical strength of a veneer sheet with lathe checks in its two opposite directions in the same plane as the sheet and substantially perpendicular to its fibers, which comprises filling glue into the lathe checks of such a veneer sheet, followed by bonding to the sheet another or other boards with glue while pressing the sheet in its foregoing two opposite directions or one of them.

Needless to say, any one of these methods of the invention leads to an improvement of the entire mechanical strength of the veneer sheet, thus increasing the practical value of the veneer sheet.

According to the above-mentioned methods, the glue applied between the sheet and another or other boards, or the glue filled into the lathe checks, or the glue applied between the sheet and another or other boards as well as that filled into the lathe checks is hardened while the sheet is pressed in its foregoing two opposite horizontal directions or one of them and, hence, in the directions or direction substantially perpendicular to its lathe checks, so that the lathe checks will not develop into noticeable gaps, but are completely or virtually closed to fix the sheet 1 into so tight an inner condition. Also, according to the above-mentioned second and third methods, the pressure applied to the sheet in its foregoing one or two horizontal direction allows the glue filled into the lathe check to spread into the inner portion thereof so as to fill a greater space in the check. Therefore, according to such methods, it is possible effectively to bond together the inner surfaces of the sheet formed by the lathe check with a relatively small amount of glue and, hence, without considerably reducing the inherent bonding strength of the glue. Such methods thus make it possible to substantially increase the mechanical strength of the veneer sheets at a low cost.

Veneer sheets having lathe checks, but reinforced according to the invention as well as products obtained by bonding to such a sheet another or other boards may be effectively used as a substitute for the usual lumber products. Thus such veneer sheets are many times greater in their practical value than before the reinforcement.

Other objects and advantages of the invention will become apparent as further details are disclosed.

DETAILED DESCRIPTION OF THE PREFERRED EMBODIMENTS

With reference to the drawings, the preferred embodiments of the invention will now be described in detail.

FIRST PREFERRED EMBODIMENT

Figure 1:
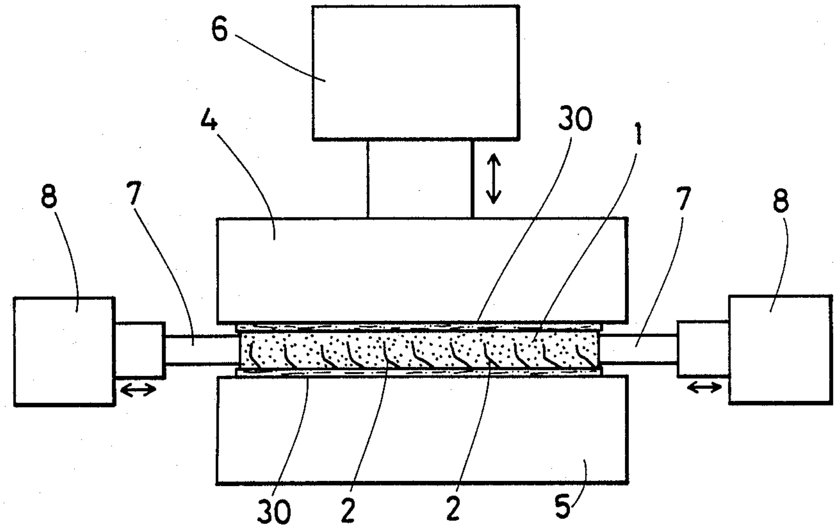
In FIG. 1 two thin boards are being bonded to a veneer sheet having lathe checks while the sheet is pressed in the two opposite horizontal directions substantially perpendicular to the fibers thereof.

FIG. 1 is a front elevation of a presser which may be used to carry out one preferred method according to the invention.

In FIGS. 1 to 4, numerals 4 and 5 designate a pair of hot plates heated to a suitable temperature with hot steam or the like. An actuator 6 including a piston is connected to the upper hot plate 4. The hot plate 4 is adapted to be moved toward or away from the lower hot plate 5 by means of the actuator 6.

Numeral 7 designates a pair of movable rods for pressing against a veneer sheet 1 with lathe checks which are located on the right-hand side of the hot plates and the left-hand side thereof, respectively, and are connected to actuators 8 for moving the rods 7 toward or away from each other, respectively. Each actuator 8 includes a piston.

With the presser of FIG. 1, one preferred method hereof for improving the mechanical strength of a veneer sheet having lathe checks is carried out as follows: A veneer sheet 1 with lathe checks 2 and having thinner veneer sheets 30 so placed on the tight and loose sides thereof that their fibers extend in horizontal directions substantially perpendicular to the fibers of the veneer sheet 1 and glued, in such orientations, to its tight and loose sides, for example, a ureic adhesive is placed on the lower hot plate 4 in such a manner that the fibers of the veneer sheet 1 and, hence, the lathe checks 2 thereof extend in horizontal directions substantially perpendicular to the direction of movement of the rods 7. Then, the upper hot plate 4 is lowered by the actuator 6 to the level where the plate 4 makes a light or heavy contact with the upper thinner sheet 30, while the rods 7 are moved by the actuators 8 to the right and left sides of the veneer sheet 1 (in FIG. 1) until pressing against the sheet 1 so as to press it in its two opposite horizontal directions substantially perpendicular to the directions of its fibers (FIG. 1). Thus the adhesive applied between the thicker sheet 1 and the thinner sheets 30 is heated and hardened through the sheets 30 by the hot plates 4 and 5, so that the sheets 30 are securely bonded or fastened to the sheet 1.

Since, as mentioned above, the veneer sheet 1 is pressed in its two opposite horizontal directions substantially perpendicular to the directions of its fibers and, hence, to its lathe checks 2 while all veneer sheets are securely fastened together, the inner openings of the sheet 1 formed by its lathe checks 2 are completely or virtually closed and the sheet 1 may be fixed into so tight an inner condition by the upper and lower sheets 30. Therefore not only the possibility of the lathe checks 2 of the veneer sheet 1 developing into noticeable or observable gaps is eliminated or greatly diminished, but the checks 2 may be made so narrow and so inconspicuous as not to be seen with the naked eyes. Products including veneer sheets having lathe checks, but reinforced in this manner have an excellent quality as compared with those including veneer sheets with lathe checks which are not reinforced in the same manner.

Needless to say, the openings of the sheet 1 formed by the lathe checks 2 are closed not only at its exposed sections, but also inside the sheet 1. Therefore, where the product is used not as one body, but after being cut into a number of pieces so that inner portions of the lathe checks 2 may be directly exposed or if the product is used with such a groove, slit or hole reaching the veneer sheet 1 so that its lathe checks 2 may be visible from outside, there is no fear or possibility that noticeable gaps may come into existence sooner or later where visible from outside. Therefore, the method hereof enlarges the range of use of veneer sheets with lathe checks.

Figure 2:
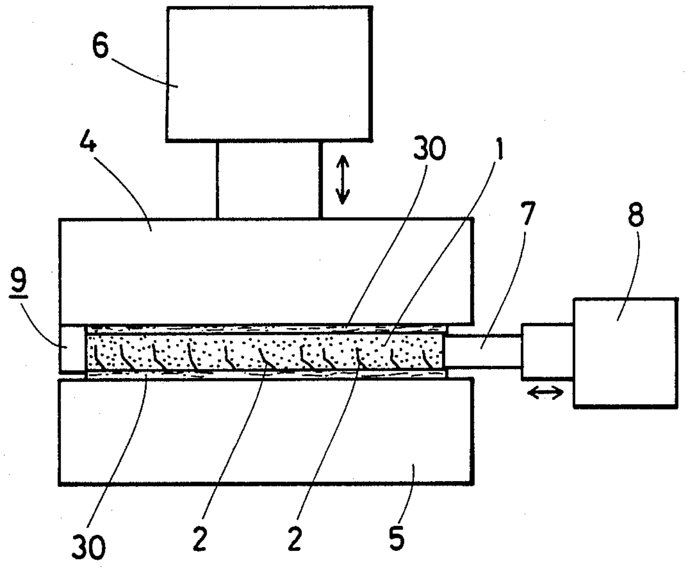
In FIG. 2 two thin boards are being bonded to a veneer sheet having lathe checks while the sheet is pressed in one horizontal direction substantially perpendicular to the fibers thereof.

The mechanical strength of veneer sheets with lathe checks may also be improved by using an apparatus of FIG. 2 which has the same construction as that of FIG. 1 except that only one movable rod 7 is provided and an upper hot plate 4 is provided, at its lower surface and on the side opposite to the rod 7, with a fixed stopper 9 against which a veneer sheet 1 having thinner veneer sheets 30 bonded thereto presses at one end thereof by being moved toward the stopper 9 by the rod 7. And the apparatus of FIG. 2 has the same function as that of FIG. 1 except that the veneer sheet 1 is pressed in its only one horizontal direction substantially perpendicular to the directions of its fibers, while being blocked by the stopper 9 at its left side (in FIG. 1). It will be appreciated, however, that the veneer sheet 1 is reinforced by using such an apparatus with an effect similar to that obtained by using the apparatus of FIG. 1.

As shown in FIGS. 1 and 2, lathe checks have a shape somewhat like the alphabetical letter "L". So, when the apparatus of FIG. 2 is used, it is desirable to press it in the direction in which the cutter has been operated to cut the veneer sheet out from a log, that is, in the direction in which the pressure to the veneer sheet is less resisted by the portions separated by the lathe checks, because it is an easier way of pressing the sheet 1 uniformly and, hence, closing the openings formed by the lathe checks uniformly.

The essentials of the first preferred embodiment of the invention are as mentioned above. Description will now be given of more detailed requirements of the methods described with reference with FIGS. 1 and 2 to be met in order to enjoy the best effect thereof.

If a veneer sheet with lathe checks is reinforced, in the foregoing method described with reference to FIGS. 1 or 2, without being dried in advance, the lathe checks may develop into noticeable gaps in course of time. Nevertheless, if the sheet is not intentionally dried in advance, the development of the lathe checks into noticeable gaps may be easily prevented by applying somewhat higher horizontal pressure or pressures to the sheet when bonding other veneer sheets to the sheet. From the viewpoint of the particular uses of products including veneer sheets with lathe checks, the bonding strength of the sheet, and the like, however, the veneer sheet not dried intentionally in advance is not necessarily a desirable one. On the other hand, if veneer sheets having lathe checks are dried completely or almost completely in advance, the lathe checks may during drying thereof become so fixed as to require a great pressure for closure thereof. Therefore, veneer sheets dried to such a degree in advance also may not be the best materials.

Experiments conducted by the inventor during the process of developing the present method have shown that it is expedient to dry a veneer sheet having lathe checks, in advance, until its moisture content is reduced to approximately 30 percent of its moisture content when it starts to contract in a measurable manner and bond other veneer sheets to such a sheet and, if necessary, to further dry the sheet by utilizing the heat of the hot plates simultaneously when securely fastening all sheets together by the presser or further dry the sheet by a suitable heating means after fastening the sheets or allow the sheet to dry naturally after fastening the sheets.

The exact degree of pressure to be applied to the veneer sheet 1 in its foregoing horizontal direction or directions when all sheets 1 and 30 are securely fastened (bonded) together should be selected according to the dryness and mechanical strength of the sheet 1, the intended quality and use of products including the sheet 1, and the like. Overpressure or short of pressure would result in making the quality of the sheet 1 unstable after the sheet 1 has been relieved of the pressure.

Suitable boards or materials which may be bonded to the veneer sheet 1 include veneer sheets having or not having relatively conspicuous lathe checks and wooden boards such as plywoods, particle boards, and hardboards. Also, plaster boards, synthetic resin boards, metal boards, paper or cloth may be used with almost no problems. The same kinds of two materials may be bonded to the tight and loose sides of the sheet 1, respectively. Two different kinds of materials may also be bonded to both sides, respectively. Also, a single sheet of material or plural sheets of materials bonded together may be bonded to the tight side and/or loose side of the sheet 1. If a veneer sheet to be bonded to the sheet 1 has relatively conspicuous lathe checks, it is desirable to press the former sheet, as in the case of the latter sheet 1, in its two opposite horizontal directions substantially perpendicular to its fibers or in one of the two directions, before bonding the two sheets together, so as to close its lathe checks.

Also, a suitable material or materials may be bonded to only one of the tight and loose sides of the sheet 1.

Figure 13:
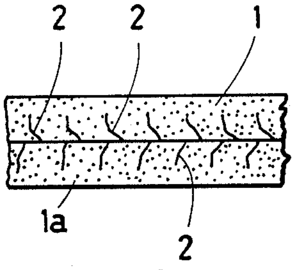
FIGS. 13, 14, and 15 show veneer sheets having lathe checks, but reinforced by bonding other boards thereto according to the invention.
Figure 14:
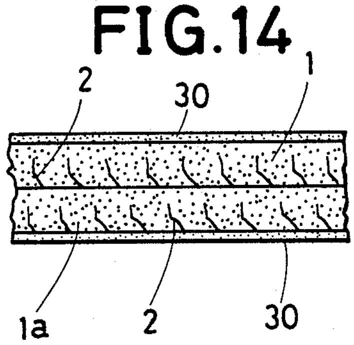
Figure 15:
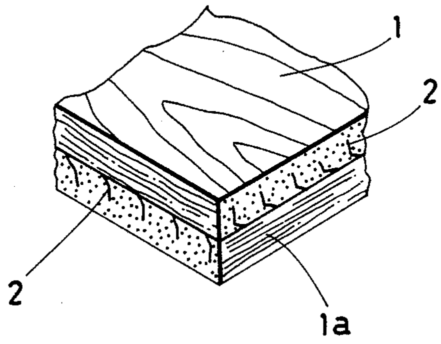

In either case where the material or materials are bonded to both tight and loose sides of the sheet 1 or to only one of them, the material should be bonded to the sheet 1 in such a manner that the sheet 1 may be prevented from expanding or contracting, after being relieved of the pressure, in the horizontal directions substantially perpendicular to the directions of its fibers. Also, if a veneer sheet having lathe checks and hence having a relatively low mechanical strength in its two opposite horizontal directions perpendicular to its fibers is to be bonded to the veneer sheet 1, the former veneer sheet preferably should be pressed in its foregoing horizontal direction or directions before bonding the two sheets together, as described above, to close the lathe checks of the former veneer sheet so as to improve its mechanical strength and then the two sheet should be preferably bonded together in a suitable manner such as follows: If such a veneer sheet 1*a* has a thickness different from that of the sheet 1, it is preferable to place the loose side of the latter sheet 1 on that of the former sheet 1*a* in such a manner that the fibers of the two sheets 1 and 1*a* extend in the same directions, and then bond the two sheets 1 and 1*a* together in such orientation (FIG. 13). On the other hand, if such a veneer sheet 1*a* is substantially the same as the sheet 1 which has substantially the same thickness, it is preferable to place the loose side of the sheet 1 on the tight side of the sheet 1*a* in the same manner as mentioned above, and then bond the two sheets 1 and 1a together in such orientations and further place two thinner veneer sheets 30 on the upper and lower surfaces, respectively, of the bonded sheets 1 and 1a so that the fibers of the sheets 30 extend in directions substantially perpendicular to those of the fibers of the sheets 1 and 1*a*, respectively, and then bond the sheets 30 to the tight and loose sides of the sheet 1, respectively, in such orientations (FIG. 14). Also, it is preferable to place the loose side of the sheet 1 on that of substantially the same sheet 1*a* in such a manner that the fibers of the sheet 1 extend in directions substantially perpendicular to those of the fibers of the sheet 1*a*, and then bond the two sheets 1 and 1*a* together in such orientations (FIG. 15). Any one of the above three different manners of bonding the two sheets together will help to prevent the two sheets from expanding or contracting in the respective horizontal directions substantially perpendicular to the fibers of the sheets because the two sheets will act to impede such expansion or contraction of each other.

With regard to the adhesive or glue used for bonding to the veneer sheet 1 another or other boards or materials, ureic adhesives (including copolycondensation resin such as urea melamine copolycondensation resin or the like), which are used for the manufacture of such products as plywoods, are advantageous in properties, cost, and the like. Even if the veneer sheet 1 has a relatively high moisture content, such adhesive may be effectively used by allowing the water contained in the adhesive to evaporate to a certain degree after applying the adhesive to the sheet 1 and before bonding to it another or other boards. The adhesives which may be used for the invention further include, but not restricted to, thermosetting adhesives, room temperature setting adhesive, thermoplastic adhesives, and wet setting adhesives. One kind of adhesive may be used with or without another or other kinds of adhesive. Also, if necessary, an additive such as a flame retardant may be used together with the adhesive.

The foregoing processing methods may also be carried out by using various suitable apparatus other than shown in FIGS. 1 and 2, including those which will be described hereinafter. Such an apparatus may be constructed according to such conditions as the properties of the adhesive use and of the boards to be bonded to the veneer sheet 1 and the like. In short, any suitable apparatus may be used if it is capable of bonding to the veneer sheet 1, having lathe checks, another or other boards while pressing the sheet 1 in its foregoing horizontal direction or directions.

Buckling of the veneer sheet 1 during application of the pressure thereto in its foregoing horizontal direction or direction should be preferably prevented since it might result in an insufficient and/or nonuniform application thereof. It may be prevented by another or other boards themselves to be bonded to the sheet 1 if such boards have a stiffness sufficient to prevent it. It may also be prevented by the hot plates of the apparatus used for the invention. Preferably it should be prevented by providing a pair of effective means therefor to make a direct or indirect contact with the front and back sides, respectively, of the sheet 1. However, if used in contact, whether direct or indirect, with the entire surfaces of the front and back sides of the sheet 1, such means may fix the sheet 1 firmly and exert on it such a force as to prevent it from being uniformly pressed in its foregoing horizontal direction or directions, especially when such means have a relatively great dimension in the same directions.

Figure 3:
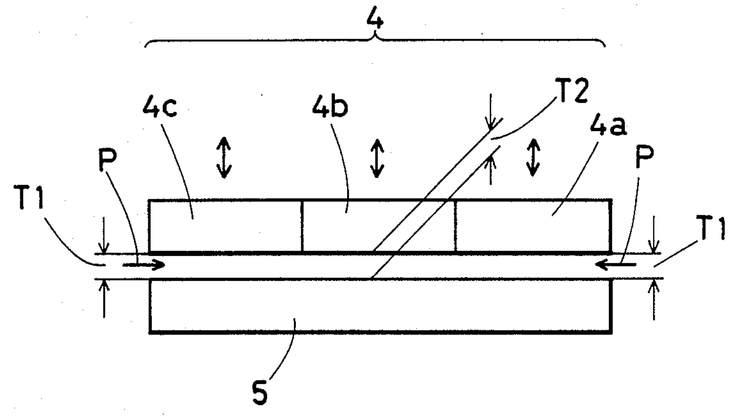
FIGS. 3 and 4 show apparatus which may be used, instead of those illustrated in FIGS. 1 and 2, for the invention.

The foregoing problem may be solved by using an apparatus of FIG. 3, instead of the apparatus of FIGS. 1 or 2, in which an upper hot plate 4 is divided into three sections 4*a*, 4*b*, and 4*c* which may be vertically moved independently of one another, while a lower hot plate 5 is not divided. In use, after the veneer sheet 1 having another or other boards glued thereto has been placed on the lower hot plate 5, the central section 4*b* is lowered until making full contact with the sheet 1, but the outer sections 4*a* and 4*c* are lowered to levels slightly higher than the central section 4*b*. That is, the distances T1 between the outer section 4*a* and the lower hot plate 5 and between the outer section 4*c* and the plate 5 are made slightly larger than the distance T2 between the central section 4*b* and the plate 5. And, in this condition, pressures P are applied to the sheet 1 from opposite directions. After application thereof but before the pressed condition of the sheet 1 is lost, the outer sections 4*a* and 4*c* are further lowered to come to the same level as the central section 4*b*, so that the other boards glued to the sheet 1 are wholly and firmly bonded thereto 1. Also, the above-mentioned problem may be solved by using an apparatus of FIG. 4 in which an upper hot plate 4 with a stopper 9 projecting downward at its one end portion may be inclined relative to a lower hot plate 5. In use, after the veneer sheet 1 having another or other boards glued thereto has been placed on the lower plate 5, the upper plate 4 is lowered until its end portion having the stopper 9 makes full contact with the sheet 1, but its other end is lowered to a level slightly higher than the end portion having the stopper 9. That is, the distance T3 between the end of the upper hot plate 4 having no stopper and the corresponding end of the lower hot plate 5 is made slightly larger than the distance T4 between the other end of the upper hot plate 4 and the corresponding end of the lower hot plate 5. And, in this condition, a pressure P is applied to the sheet 1. After application thereof but before the pressed condition of the sheet 1 is lost, the end of the upper hot plate 4 having no stopper is lowered to the same level as its other end so that the other boards glued to the sheet 1 are wholly and firmly bonded thereto. When using either apparatus of FIGS. 3 or 4, the pressure or pressures P may be applied to the sheet 1 with a considerable uniformity since, at this time, the sheet 1 is being pressed from above at only one portion thereof, and if the sheet 1 has been more or less buckled by the pressure or pressures P, it may be flattened when the entire upper hot plate 4 is pressed against the material on the lower hot plate 5. Therefore, it will be appreciated that either apparatus of FIGS. 3 or 4 makes it possible to reinforce the veneer sheet 1 in such a manner that the sheet 1 will be finally free from a buckling effect.

Figure 4:
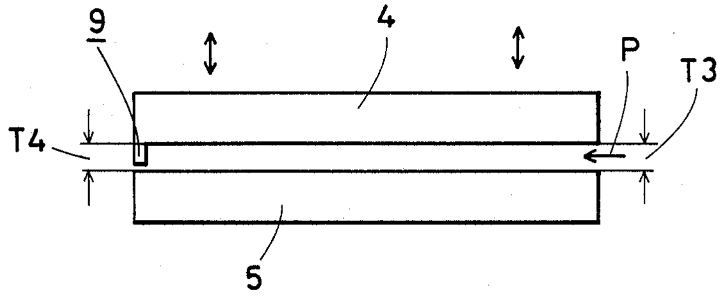

For the same purpose as above, such an apparatus may also be employed which is similar to that of FIGS. 3 or 4, but constructed to prevent the buckling of the sheet 1 at more than one portion thereof while the pressure or pressures P are being applied thereto (although such an apparatus is not shown in the drawings).

If another board is bonded to only one of the tight and loose sides of the veneer sheet 1 by using a room temperature setting adhesive, a suitable elastic means, such as a rubber plate, may be stretched and pressed, in such a condition, against the other surface of the sheet 1, and then returned to its original size so that the rubber plate applies a uniform pressure to the sheet 1 in its foregoing opposite horizontal directions.

As described above, with such an apparatus as shown in FIGS. 3 or 4, the entire method for reinforcing the sheet 1 may be generally divided into a first step of uniformly pressing the sheet 1 in its foregoing horizontal direction or directions and a second step of firmly bonding the sheet and other boards together while eliminating a buckling of the sheet which may have occurred during the first step, so as to produce a substantially reinforced veneer product with no buckling effect. On the other hand, however, it is also possible to press the sheet 1 uniformly in its foregoing horizontal direction or directions by positively utilizing a force from above to fix the sheet firmly between the upper and lower hot plates 4 and 5, and this may be done, for example, by using an apparatus obtained by omitting the stopper 9 from the apparatus of FIG. 4. And, if such an apparatus is used in conjunction with a well-known continuous press, a number of veneer sheets with lathe checks may be successively reinforced (according to the methods hereof) and discharged from the outlet provided by omitting the stopper 9.

The methods of the invention described above make it possible to considerably improve the mechanical strength of veneer sheets having lathe checks, including very thick such veneer sheets (e.g., with a thickness of 10 millimeters or more), which have conventionally not been put to practical use, so that the practical value of such veneer sheets may be remarkably increased. Therefore, the methods of the invention are extremely valuable for the industries related to veneers.

SECOND PREFERRED EMBODIMENT

Another embodiment of the invention may be obtained by filling glue or adhesive into lathe checks of a veneer sheet for the methods according to the first preferred embodiment. Such another embodiment will now be described in detail.

Figure 8:
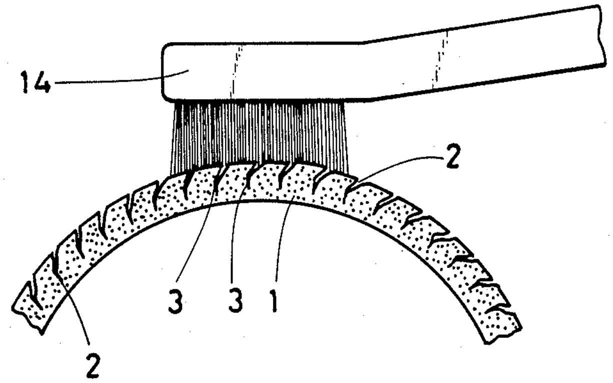
FIG. 8 also shows glue or adhesive being filled into lathe checks of a veneer sheet.

First, a suitable glue or adhesive 3, such as ureic adhesive, is applied to both tight and loose sides of a veneer sheet 1 having lathe checks 2, with a brush 14, so that not only the foregoing two sides of the sheet 1 are covered with the adhesive, but also its lathe checks 2 are filled therewith (FIG. 8). Then, two thinner veneer sheets 30 are placed on the tight and loose sides, respectively, of the veneer sheet 1 in such a manner that the fibers of the thinner veneer sheets 30 extend in directions substantially perpendicular to those of the fibers of the sheet 1, and the whole is placed on the lower hot plate 5 of the apparatus of FIG. 1 in such a manner that the fibers of the veneer sheet 1 and, hence, the lathe checks 2 thereof extend in horizontal directions substantially perpendicular to the direction of movement of the rods 7. Then, the upper hot plate 4 is lowered until making full contact with the upper thinner veneer sheet 30 with a medium pressure or a stronger pressure, while the rods 7 are moved inward to press against the right and left sides of the veneer sheet 1 (in FIG. 1) so that the veneer sheet 1 is pressed in its two opposite horizontal directions substantially perpendicular to the directions of its fibers. The adhesive applied between the sheets 1 and 30 as well as that filled into the lathe checks 2 of the sheet 1 is thus heated and hardened through the thinner sheets 30 so that the sheets 1 and 30 are securely bonded or fastened together.

Also, since, as mentioned above, the veneer sheet 1 is pressed in its two opposite horizontal directions substantially perpendicular to the directions of its fibers and, hence, to its lathe checks 2 while all sheets are securely fastened together, the inner openings of the sheet 1 formed by its lathe checks 2 are completely or virtually closed and the sheet 1 may be fixed into so tight an inner condition by the upper and lower sheets 30 securely bonded to the sheet 1 as well as by the adhesive supplied into the lathe checks 2. It will be appreciated, in particular, that the adhesive 3 filled into the lathe checks 2 spreads more uniformly therein, as the checks 2 are closed, so that the adhesive 3 fills a greater space in each check 2 and securely bonds together the inner opposite walls of the check 2. Thus not only the possibility of the lathe checks 2 of the veneer sheet 1 developing into noticeable or observable gaps is eliminated or greatly diminished, but the checks 2 may be made and maintained so narrow and so inconspicuous as not to be easily seen with the naked eyes.

Therefore it will also be appreciated that such a method makes it possible to completely or substantially close the lathe checks and firmly bond together the inner walls thereof with a relatively small amount of adhesive and, hence, without considerably reducing the inherent bonding strength of the adhesive. Thus such a method makes it possible considerably to increase the mechanical strength of veneer sheets with lathe checks at a low cost. Also, according to such a method, even if the adhesive filled into the lathe checks has a shade of color more or less different from that of the veneer sheet 1, the adhesive will not make the lathe checks conspicuous since the lathe checks are completely or virtually closed. Therefore, veneer sheets having lathe checks, but reinforced in such a manner has an excellent appearance as well as a substantial mechanical strength. Such a method thus enlarges the range of use of products including such veneer sheets.

According to the foregoing method, needless to say, the openings of the sheet 1 formed by the lathe checks 2 are closed not only at its exposed sections, but also inside the sheet 1. Therefore, where products including veneer sheets reinforced by the foregoing method are used not as one body, but after being cut into a number of pieces so that inner portions of the lathe checks may be directly exposed or if such a product is used with a groove, slit or hole reaching the veneer sheet so that its lathe checks may be visible from outside, there is no fear or possibility that noticeable gaps may come into existence sooner or later where visible from outside.

Experiments made by the inventor have shown that, according to the above-mentioned method, the filling of the lathe checks 2 with substantially the same amount of adhesive as applied to the tight and loose sides of the veneer sheet 1 for bonding the sheets 30 thereto is sufficient to increase the mechanical strength of the sheet 1 in its foregoing two opposite horizontal directions, up to a degree practically equal to the mechanical strength of the usual lumber products of common materials. More specifically, the use of only such a medium amount of adhesive makes it possible considerably to increase the bending strength of the sheet 1 as well as its force to support nails and screws and the breaking strength of its opposite end portions along the fibers of the sheet 1. The range of use of veneer sheets reinforced by the above-mentioned method, as well as products including such veneer sheets, may be accordingly enlarged.

The above-mentioned method may be modified by using the apparatus of FIG. 2 described in connection with the first preferred embodiment, that is, by pressing the veneer sheet 1 in its only one horizontal direction substantially perpendicular to the directions of the fibers of the sheet 1. It will be appreciated, however, that the apparatus of FIG. 2 makes it possible to improve the mechanical strength of the sheet 1 with an effect similar to that obtained by using the apparatus of FIG. 1.

As mentioned previously, lathe checks have a shape somewhat like the alphabetical letter "L". So, when the apparatus of FIG. 2 is used, it is desirable to press it in the direction in which the cutter has been operated to cut the veneer sheet out from a log, that is, in the direction in which the pressure to the veneer sheet is less resisted by the portions separated by the lathe checks, because it is an easier way of pressing the sheet 1 uniformly and, hence, closing the openings formed by the lathe checks uniformly.

The essentials of the methods according to the second preferred embodiment described with reference to FIGS. 1 and 2 are as mentioned above. Detailed requirements of these methods regarding the shape of the veneer sheet 1, its moisture content, another or other boards to be bonded to the sheet 1, and the manner of bonding the other boards to the sheet 1 to be met to enjoy the best effect thereof are substantially the same as those of the first embodiment.

Any suitable adhesive, such as those described in connection with the first embodiment, may be applied to the tight and/or loose surface of the veneer sheet 1 for bonding another or other boards thereto. As seen from the previous description, the same adhesive as applied to the surface of the sheet 1 may be filled into its lathe checks. Preferably, however, a highly diffusible adhesive should be filled into the lathe checks from the viewpoint of the inner configuration of the lathe check.

Figure 5:
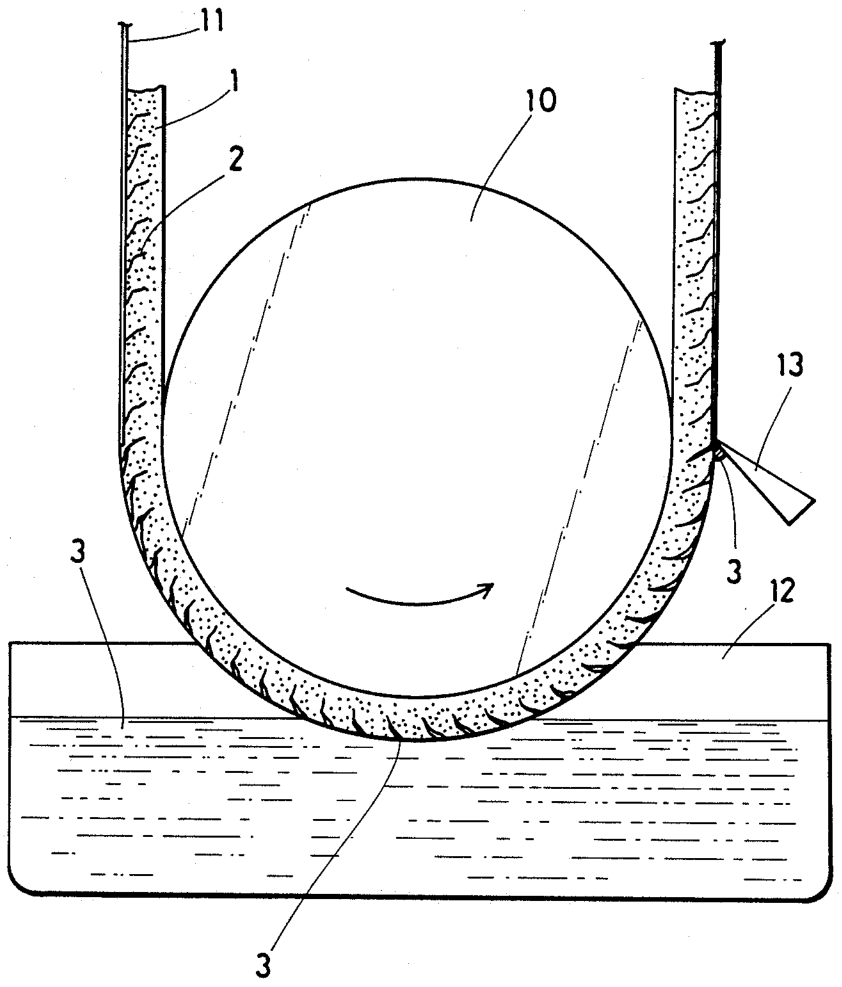
FIG. 5 shows glue or adhesive being filled into lathe checks of a veneer sheet.
Figure 16:
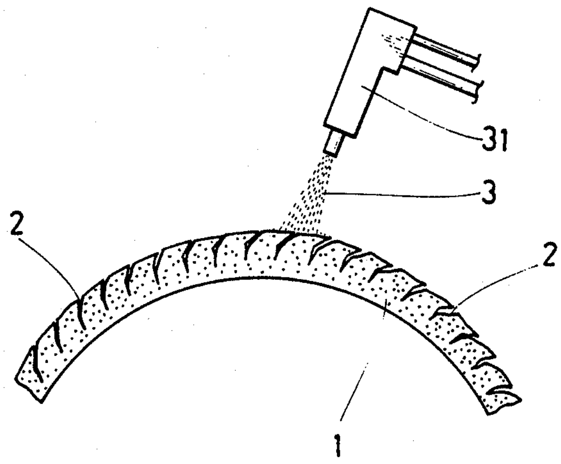
FIGS. 16 and 17 also illustrate glue or adhesive being filled into lathe checks of veneer sheets.
Figure 17:
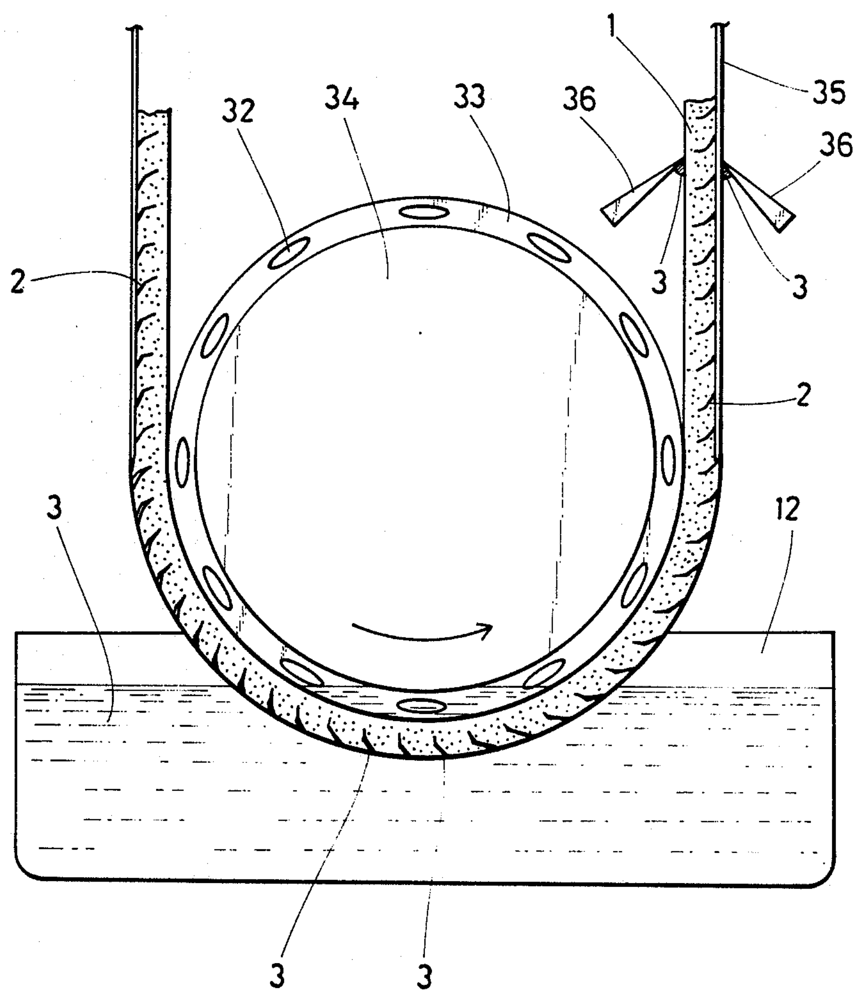

The means used for filling the adhesive into the lathe checks is not restricted to the brush 14 (FIG. 8), but may be any other suitable device. For example, a spray 31 may be used (FIG. 16). Also, such an arrangement as shown in FIG. 5 may be employed which includes a tank 12 holding adhesive 3, a rotatable roll 10 and a slender material 11, such as a piano wire or a fishing line, partly disposed along the lower half of the circumference of the roll 10 for supporting the veneer sheet 1. In use, the veneer sheet 1 is moved, while being supported by and between the rotatable roll 10 and the slender material 11, so as to be immersed in the adhesive. The adhesive 3 is thus filled into the lathe checks 2 of the sheet 1. A surplus of the adhesive on the lower surface of the sheet 1, if any, may be removed with a spatula 13. Also, such an arrangement as shown in FIG. 17 may be employed which includes a tank 12 holding adhesive 3, a rotatable roll 34 having a plurality of thin circular rings 33 axially spaced apart, by desired distances, from one another on the circumference of the roll 34 and each provided with a plurality of equally spaced-apart holes 32, and a slender material 35, such as a plano wire or a fishing line, partly disposed along the lower half of the circumference of the roll 34 for supporting the veneer sheet 1. In use, each ring 33 is immersed in the adhesive 3 in the tank 12 at it lowest portion, which is varied as the roll 34 is rotated. When in the adhesive 3, each hole 32 of the ring 33 allows the adhesive 3 to pass therethrough. The veneer sheet 1 is moved, while being supported by and between the rotatable roll 34 and the slender material 35, so as to be immersed in the adhesive 3. The adhesive 3 is thus filled into the lathe checks 2 of the sheet 1 while also being applied to its tight and loose sides. The arrangement of FIG. 17 is further provided with a pair of slitters 36 for controlling the amount of the adhesive applied to both tight and loose sides of the sheet 1. As clearly shown in FIGS. 5, 8, 16, and 17, the veneer sheet 1 preferably should be more or less bent to enlarge the lathe checks 2 temporarily, for ease of filling the adhesive thereinto as well as for the uniform filling thereof. After the veneer sheet 1 has been treated in the foregoing manner, if desired, the portion of the adhesive applied to the tight and loose sides of the sheet 1 may be removed, and then another kind of adhesive may be applied thereto for bonding to the sheet 1 another or other boards or may be applied to such another or other boards for the same purpose.

The apparatus which may be used for the methods according to the second embodiment is not restricted to those of FIGS. 1 and 2, but may be such as shown in FIGS. 3 or 4 or other suitable one constructed according to such conditions as the properties of the adhesive used and of the boards to be bonded to the veneer sheet 1, the particular shapes of the boards, and the like. In short, any suitable apparatus may be used if it is capable of bonding to the veneer sheet 1, having lathe checks, another or other boards while pressing the sheet 1 in its foregoing horizontal direction or directions.

Buckling of the veneer sheet 1 during application of the pressure thereto in its foregoing horizontal direction or directions should be preferably prevented since it might result in an insufficient and/or nonuniform application thereof. It may be prevented by any suitable one of the methods therefor described in connection with the first embodiment.

As with those of the first embodiment, the methods of the second embodiments make it possible to considerably improve the mechanical strength of veneer sheets having lathe checks, including very thick such veneer sheets (e.g., with a thickness of 10 millimeters or more), which have conventionally not been put to practical use, so that the practical value of such veneer sheets may be remarkably increased.

THIRD PREFERRED EMBODIMENT

A still another embodiment of the invention may be obtained by omitting the step of bonding to the veneer sheet 1 another or other boards from the methods according to the second embodiment. Such still another embodiment will now be described in detail.

Figure 9:
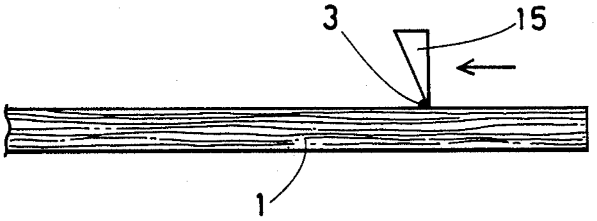
FIG. 9 shows the removal of a surplus of glue or adhesive.
Figure 10:
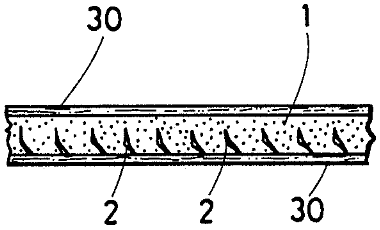
FIG. 10 shows a veneer sheet with lathe checks to which thinner boards are bonded by the conventional method.
Figure 11:
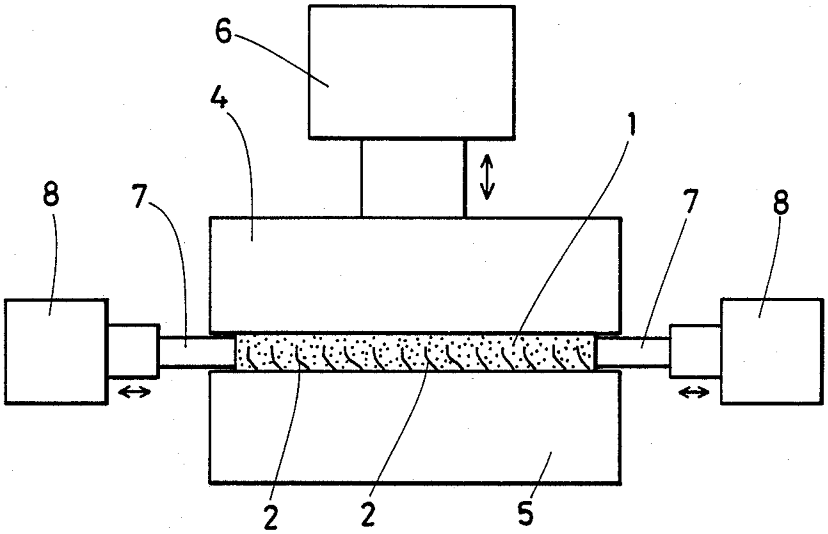
In FIG. 11 a veneer sheet having lathe checks filled with glue or adhesive is being pressed in the two opposite horizontal directions perpendicular to the fibers of the sheet.

First, a suitable glue or adhesive 3, such as ureic adhesive, is filled into lathe checks 2 of a veneer sheet 1 with a brush 14 (FIG. 8), and a surplus of the glue, if any, is removed with a spatula 15 (FIG. 9). Then, the veneer sheet 1 is placed on a lower hot plate 5 of a presser of FIG. 11 in such a manner that the fibers of the veneer sheet 1 and, hence, the lathe checks 2 thereof extend in horizontal directions substantially perpendicular to the direction of movement of a pair of rods 7. Since the presser of FIG. 11 is exactly the same apparatus as that of FIG. 1 in its construction and operation, the description of further details of this apparatus will be omitted. After the veneer sheet 1 has been placed on the lower hot plate 5, the upper hot plate 4 is lowered until making contact with the veneer sheet 1, while the rods 7 are moved inward to press against the right and left sides of the veneer sheet 1 so that it is pressed in its two opposite horizontal directions substantially perpendicular to the directions of its fibers. The adhesive 3 filled into the lathe checks 2 is heated and hardened by the hot plates 4 and 5 while the sheet 1 is thus being pressed from above as well as from its right and left sides (in FIG. 11).

The pressures applied, by the rods 7, to the sheet 1 in its foregoing two opposite horizontal directions cause the inner openings of the sheet 1 formed by its lathe checks 2 to be completely or virtually closed, thus allowing the adhesive 3 therein to spread in its inner portion and fill a greater space therein. Therefore, as with the second embodiment, a relatively small amount of the adhesive 3 is sufficient to firmly bond the opposite walls of each lathe checks 2 together. And, it means that the bonding of the opposite walls may be made without reducing the bonding strength of the adhesive as well as at a relatively low cost. In other words, according to such a method, a substantial improvement of the mechanical strength of the veneer sheet 1 may be made at a relatively low cost.

Experiments conducted by the inventor have shown that a veneer sheet 10 millimeters thick and having lathe checks, but reinforced by filling approximately 3 grams of ureic adhesive into each area of 10 square centimeters of the lathe checks and hardening the adhesive according to the above-mentioned method has at least twice the mechanical strength of a veneer sheet with the same characteristics and reinforced by filling the same adhesive into its lathe checks, but followed by a mere hardening of the adhesive.

Veneer sheets having lathe checks, but substantially reinforced according to the foregoing method may be used, as a substitute for the usual lumber products of common materials or the like, with or without other boards bonded thereto. Such veneer sheets, therefore, may be many times greater in its practical value than before reinforcement.

Figure 12:
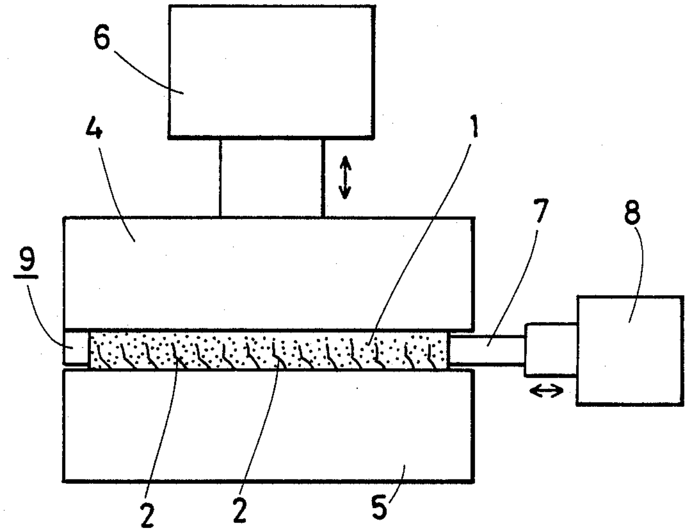
In FIG. 12 a veneer sheet having lathe checks filled with glue or adhesive is being pressed in one horizontal direction substantially perpendicular to the fibers of the sheet.

The above-mentioned method may be modified by using an apparatus of FIG. 12 which is the exactly the same as that of FIG. 2, that is, by pressing the veneer sheet 1 in its only one horizontal direction substantially perpendicular to the directions of the fibers of the sheet 1. It will be appreciated, however, that the apparatus of FIG. 12 makes it possible to improve the mechanical strength of the sheet 1 with an effect similar to that obtained by using the apparatus of FIG. 11.

As mentioned previously, lathe checks have a shape somewhat like the alphabetical letter "L". So, when the apparatus of FIG. 12 is used, it is desirable to press it in the direction in which the cutter has been operated to cut the veneer sheet out from a log, that is, in the direction in which the pressure to the veneer sheet is less resisted by the portions separated by the lathe checks, because it is an easier way of pressing the sheet 1 uniformly and, hence, closing the openings formed by the lathe checks uniformly.

The essentials of the methods according to the third preferred embodiment described with reference to FIGS. 11 and 12 are as mentioned above. Detailed requirements of these methods regarding the moisture content of the veneer sheet 1 to be met to enjoy the best effect thereof are substantially the same as those of the first embodiment. The exact degree of pressure to be applied to the veneer sheet 1 in its foregoing horizontal direction or directions may be selected according to the dryness of the sheet 1, the sizes of the lathe checks 2, the amount of the adhesive used, intended use of the product or the like. Although, as already mentioned, the lathe checks 2 of the sheet 1 can be completely closed according to the present methods, the degree of the foregoing pressure is not necessarily required to be enough to do so, but may be such as to close them so that the sheet 1 may be reinforced as desired for the particular application.

With regard to the adhesive to be filled into the lathe checks 2 of the veneer sheet 1, ureic adhesives (including copolycondensation resin such as urea melamine copolycondensation resin or the like), which are used for the manufacture of such products as plywoods, are advantageous in properties, cost, and the like. Even if the veneer sheet 1 has a relatively high moisture content, such an adhesive may be effectively used by allowing the water contained in the adhesive to evaporate to a certain degree after filling the adhesive and before closing the checks. The adhesive which may be used for the third embodiment furher include, but not restricted to, thermosetting adhesive, room temperature setting adhesive, thermoplastic adhesive, and wet setting adhesive. One kind of adhesive may be used with or without another or other kinds of adhesives. From the viewpoint of the shapes of the lathe checks, it is preferable to use a highly diffusible adhesive.

Figure 6:
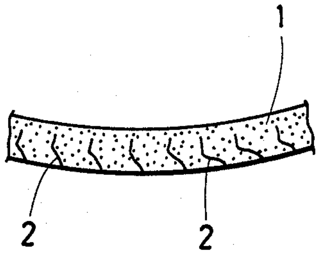
FIGS. 6 and 7 show veneer sheets having lathe checks.
Figure 7:
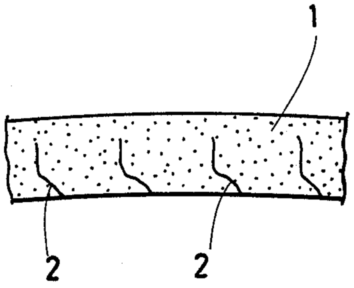

With regard to the device for filling the adhesive into the lathe checks, any suitable one, such as that of FIGS. 5 or 6, may be employed instead of the brush 14. As with the second embodiment, the veneer sheet 1 preferably should be more or less bent to enlarge its lathe checks 2 temporarily, for ease of filling the adhesive therein as well as for uniformity of filling thereof. Needless to say, it is economical to remove a surplus of the adhesive which may be present on the surface of the sheet 1. However, if not having an adverse effect on the hardening of the adhesive filled into the lathe checks, the surplus may be left on the surface. Or the surplus may be removed by, for example, sanding, after the adhesive in the lathe checks has been hardened.

The apparatus which may be used for the methods according to the second embodiment is not restricted to those of FIGS. 11 and 12, but may be such as shown in FIGS. 3 or 4 or other suitable one constructed according to such conditions as the properties of the adhesive used, the particular shape of the veneer sheet 1, and the like. In short, any suitable apparatus may be used if it is capable of hardening the adhesive filled into the lathe checks while pressing the sheet 1 in its foregoing horizontal direction or directions.

Buckling of the veneer sheet 1 during application of the pressure thereto in its foregoing horizontal direction or directions should be preferably prevented since it might result in an insufficient and/or nonuniform application thereof. It may be prevented by any suitable one of the methods therefor described in connection with the first embodiment.

As with those of the first embodiemnt, the methods of the third embodiment make it possible to considerably improve the mechanical strength of veneer sheets having lathe checks, including very thick such veneer sheets (e.g., with a thickness of 10 millimeters or more), which have conventionally not been put to practical use, so that the practical value of such veneer sheets may be remarkably increased.

Although, in the drawings, the veneer sheet 1 is illustrated as being disposed in a horizontal plane, it also may be disposed in any other plane to carry out the methods of the invention. Therefore, in this specification, the term "horizontal directions" as used to define the directions in which the veneer sheet 1 is pressed substantially perpendicularly to the directions of its fibers holds true only when, as shown in the drawings, the sheet 1 is disposed in a horizontal plane, and is to be replaced with another correct term if the sheet 1 is otherwise disposed to be processed according to the invention. For example, if the sheet 1 is vertically disposed, any method of the invention is carried out, while pressing it in its two opposite "vertical directions" or in its one "vertical direction" substantially perpendicular to the directions of its fibers. Similarly, other terms such as the "upper hot plate" and "lower hot plate" of the apparatus used for the invention are to be replaced with the other correct terms if the sheet 1 is otherwise disposed.

What is claimed is:

1. A method for improving the mechanical strength of a veneer sheet with a loose side having lathe checks and with an opposite tight side having no lathe checks, which comprises bonding a second sheets to as least one of said tight and loose sides of the veneer sheet with glue while pressing the veneer sheet in at least one of two opposite directions in the same plane as the veneer sheet itself and substantially perpendicular to the directions of its fibers.

2. A method in accordance with claim 1 wherein said second sheet is a veneer sheet having conspicuous lathe checks.

3. A method in accordance with claim 1 wherein said second sheet is a board constructed of one of the following materials; plywood, particle board, or hardboard.

4. A method in accordance with claim 1 wherein said second sheet is a veneer sheet not having conspicuous lathe checks.

5. A method in accordance with claim 1 wherein two other sheets are bonded to said tight and loose sides of the veneer sheet, respectively.

6. A method in accordance with claim 1 wherein the veneer sheet is pressed in one of said two opposite directions in which a cutter has been operated to cut the veneer sheet out from a log during production thereof.

7. A method for improving the mechanical strength of a veneer sheet with a loose side having lathe checks and with an opposite tight side having no lathe checks, which comprises filling glue into said lathe checks of the veneer sheet and bonding a second sheet to at least one of said tight and loose sides of the veneer sheet with glue while pressing the veneer sheet in at least one of two opposite directions in the same plane as the veneer sheet itself and substantially perpendicular to the directions of its fibers.

8. A method in accordance with claim 7 wherein said second sheet is a board constructed of one of the following materials: plywood, particle board, or hardboard.

9. A method in accordance with claim 7 wherein two other sheets are bonded to said tight and loose sides of the veneer sheet, respectively.

10. A method in accordance with claim 7 wherein the pressing of the veneer sheet in at least one of said two opposite directions is so made as to completely close the inner openings of the veneer sheet formed by the lathe checks thereof.

11. A method in accordance with claim 7 wherein the pressing of the veneer sheet in at least one of said two opposite directions is so made that said glue filled into said each lathe check of the veneer sheet substantially fills the inner opening of the veneer sheet formed by said each lathe check thereof.

12. A method in accordance with claim 7 wherein said second sheet is a veneer sheet not having conspicuous lathe checks.

13. A method in accordance with claim 7 wherein the veneer sheet is pressed in one of said two opposite directions in which a cutter has been operated to cut the veneer sheet out from a log during production thereof.

14. A method in accordance with claim 7 wherein said second sheet is a veneer sheet having conspicuous lathe checks.

15. A method for improving the mechanical strength of a veneer sheet having lathe checks, which comprises filling glue into the lathe checks of the veneer sheet and hardening said glue while pressing the veneer sheet in at least one of two opposite directions in the same plane as the veneer sheet itself and substantially perpendicular to the directions of its fibers.

16. A method in accordance with claim 15 wherein the pressing of the veneer sheet in at least one of said two opposite directions is so made as to completely close the inner openings of the veneer sheet formed by the lathe checks thereof.

17. A method in accordance with claim 15 wherein the pressing of the veneer sheet in at least one of said two opposite directions is so made that said glue filled into said each lathe check of the veneer sheet substantially fills the inner opening of the veneer sheet formed by said each lathe check thereof.

18. A method in accordance with claim 15 wherein the veneer sheet is pressed in one of said two opposite directions in which a cutter has been operated to cut the veneer sheet out from a log during production thereof.

* * * * *

UNITED STATES PATENT AND TRADEMARK OFFICE

CERTIFICATE OF CORRECTION

PATENT NO. : 4,747,899

DATED : May 31, 1988

INVENTOR(S) : Katsuji Hasegawa

It is certified that error appears in the above-identified patent and that said Letters Patent is hereby corrected as shown below:

Column 16, line 2, change "sheets" to --sheet--.

Column 16, line 2, change "as" to --at--.

Signed and Sealed this

Thirty-first Day of January, 1989

*Attest:*

DONALD J. QUIGG

*Attesting Officer*

*Commissioner of Patents and Trademarks*